United States Patent

[11] 3,587,306

| [72] | Inventor | Max B. Bryan |
| | | Yorktown, Va. |
| [21] | Appl. No. | 874,435 |
| [22] | Filed | Nov. 6, 1969 |
| [45] | Patented | June 28, 1971 |

[54] WIND TUNNEL MODEL DAMPER
11 Claims, 8 Drawing Figs.

| [52] | U.S. Cl. | 73/147 |
| [51] | Int. Cl. | G01m 9/00 |
| [50] | Field of Search | 73/147 |

[56] References Cited
UNITED STATES PATENTS
3,382,712   5/1968   Curry .......................... 73/147

*Primary Examiner*—S. Clement Swisker
*Attorneys*—Howard J. Osborn, Wallace J. Nelson and G. T. McCoy

ABSTRACT: A damper system for alleviating air flow shock loads on a wind tunnel model during the starting and shutdown phases of a wind tunnel where unsteady flow normally exists leading to large, unsteady model loads and possible damage to the model and test balances on the model.

INVENTOR.
MAX B. BRYAN

INVENTOR.
MAX B. BRYAN

3,587,306

WIND TUNNEL MODEL DAMPER

ORIGIN OF THE INVENTION

This invention was made by an employee of the National Aeronautics and Space Administration and may be manufactured and used by or for the Government of the United States without the payment of any royalties thereon or therefor.

This invention relates generally to a damper system and relates in particular to a damper for a wind tunnel model serving to alleviate some of the unsteady load forces normally experienced on a wind tunnel model and its balances during sudden starting and shutdown of high-speed wind tunnels.

During the starting and stopping phases of high-speed wind tunnels, for example, in the supersonic and hypersonic speed ranges, a state of unsteady flow exists in the test section. This unsteady flow induces undesirable oscillating aerodynamic loads on the test model that greatly exceed the load limits of the strain-gauge balances used to measure the steady-state model forces and moments.

Several methods have previously been proposed to reduce these undesirable transient aerodynamic loads. One prior art system utilizes a conical shield which is injected into the tunnel flow ahead of the model to intercept and deflect the tunnel starting and stopping shocks. This device requires special shield-retraction mechanisms unavailable at many facilities and severely limits the size of the model which can be tested. Other systems immobilize the balance-sting-model system by means of jamb blocks or brakeshoelike devices which are mechanically complex and require critical, time-consuming adjustments which must be altered to suit the specific model under test.

Accordingly, it is an object of the present invention to provide a new and and novel damper system for alleviating undesirable oscillating aerodynamic loads on a test model-balance system in a wind tunnel test.

Another object of the present invention is a damper for alleviating flow shock loads on a wind tunnel model during starting and stopping of the wind tunnel.

Another object of the present invention is a selectively inflatable system for damping undesired transit loads on a balance-sting-model system during starting and stopping of a wind tunnel test.

Another object of the present invention is a selectively movable spring system for alleviating flow shock loads on a wind tunnel.

According to the present invention, the foregoing and other objects are attained in one aspect of the present invention by providing in a wind tunnel test operation, a pneumatic damper consisting of a balloonlike device adapted to fit snugly around a model sting inside the model cavity but aft of the strain-gauge balance. In the deflated condition sufficient clearance is provided between the damper and model to insure fouling-free test data. In the inflated position the damper provides a firm contact between the model and rigid sting support to thereby reduce the foreces transmitted to the model balance. Inflation of the damper is accomplished by injecting pressurized air into the damper compartments and deflation by releasing the pressure or by vacuum. The damper is divided into two or more separate compartments each of which is fitted with an independent air inlet-exhaust tube to provide independent inflation as a precaution against system failure if one of the compartments should rupture and to provide vacuum deflation if required. Also, each compartment is divided into three or more longitudinal divisions to provide additional stiffness and rigidity to the damper.

In another aspect of the present invention a mechanical damper is employed and consists of a pair of spaced ring members slidably received by the sting support and having a plurality of spaced spring steel fingers connected to each ring and in circumferential relationship about the sting. In the normal position the rings are relatively extended from each other and the spring steel fingers lay flat adjacent the sting and spaced from the model. When the ring members are moved relatively toward each other the steel fingers flex away from the sting to engage the model and assist in support of the model by providing internal load forces thereon perpendicular to the load forces produced by wind tunnel flow.

A more complete appreciation of the invention and many of the attendant advantages thereof will be better understood as the same becomes more apparent by reference to the following detailed description when considered in connection with the accompanying drawings, wherein.

Figure 1:
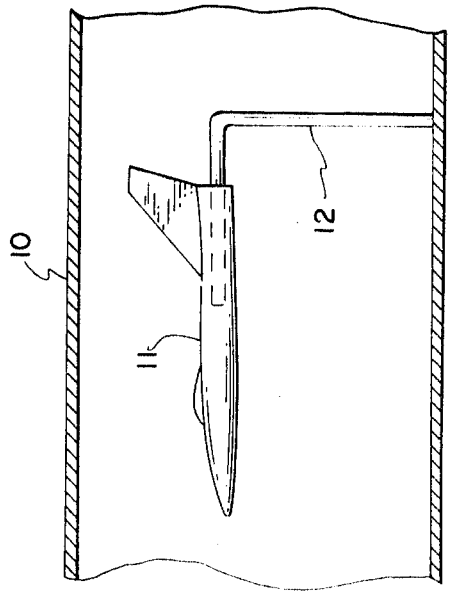
FIG. 1 is a part sectional view of a wind tunnel having a model positioned therein for testing.
Figure 2:
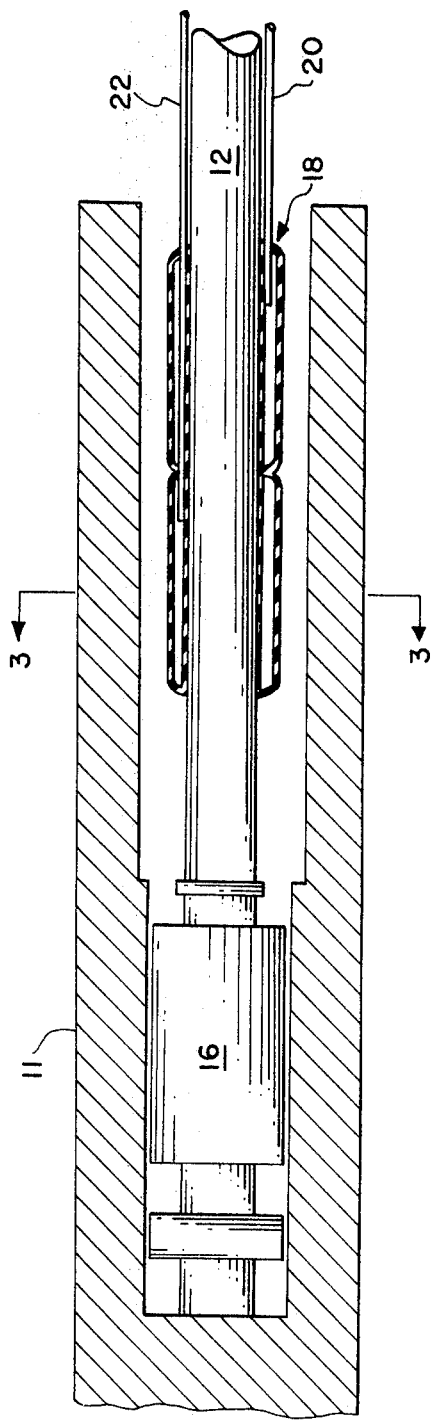
FIG. 2 is an enlarged part sectional view of the aft end of the model shown in FIG. 1 with the inflatable damper of the present invention in deflated condition on the wind tunnel sting.
Figure 3:
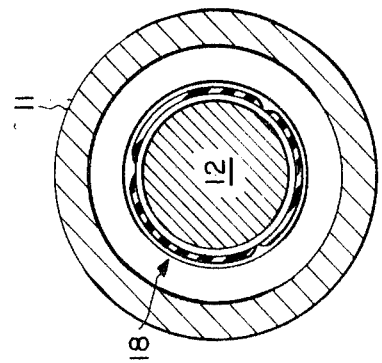
FIG. 3 is a sectional view taken along lines 3–3 of FIG. 3.

Referring now to the drawings, FIG. 1 shows a part sectional view of the test section of a wind tunnel 10 having an aerodynamic model 11 on a rigid support sting 12 therein in position for testing. In FIG. 2, it is seen that support sting 12 is received by a stepped elongated opening 14 at the aft end of model 11. A six-component, internal strain gauge balance 16 is mounted on the end of sting 12 and in contact with model 11 and is used to measure forces on the test model. A pneumatic damper, designated generally by reference numeral 18, is fixedly positioned snugly about a portion of the length of sting 12 inside elongated opening 14 but aft of balance 16. In the deflated condition shown in FIG. 2, there is sufficient clearance remaining between damper 18 and opening 14 in model 11 to allow unrestricted deflection of the model-balance system to thereby provide foul-free test data. In the inflated condition (FIG. 4) damper 18 provides a firm contact between model 11 and sting 12 to thereby produce load forces against model 11 perpendicular to the forces produced by wind tunnel flow thereby reducing the forces transmitted to balance 16. This additional support of model 11 serves to dampen or alleviate the airflow shock loads on model 11 and balance 16 during the starting and stopping phases of wind tunnel operation where unsteady flow exists that could possibly cause damage to model 11 and balance 16.

Figure 4:
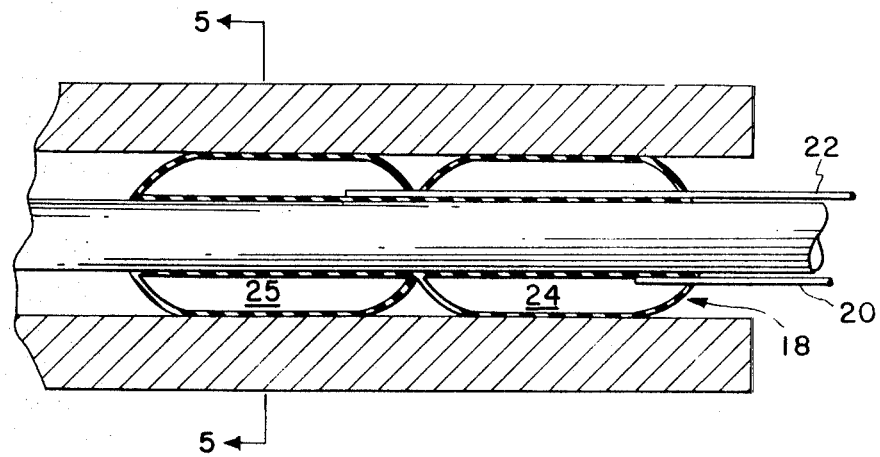
FIG. 4 is a part sectional view similar to FIG. 2 showing the inflatable damper in inflated condition.
Figure 5:
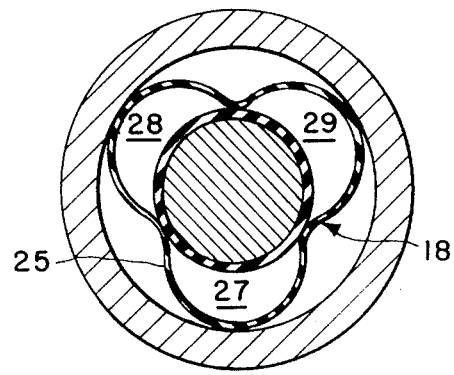
FIG. 5 is a sectional view taken along lines 5–5 of FIG. 4.

Inflation of damper 18 is accomplished by injecting pressurized air into the damper compartments through air inlets 20 and 22. The release of the pressure serves to deflate damper 18 by the return of the damper material to a relaxed state. Inlets 20 and 22 also may be used for vacuum deflation found useful with sluggish synthetic rubber and the like. The embodiment shown in FIGS. 2–5 illustrates a damper 18 with two compartments 24 and 25. As shown in FIG. 4, each compartment is provided with an independent inlet-exhaust tube to provide independent inflation if one of the compartments should rupture. Thus, inlet tube 20 leads to compartment 24 while inlet tube 22 leads to compartment 25. Each compartment 24 and 25 is divided into three longitudinal divisions to provide additional stiffness and rigidity to damper 18. Note, FIG. 5 shows compartment 25 of damper 18 divided into divisions 27, 28 and 29.

Figure 6:
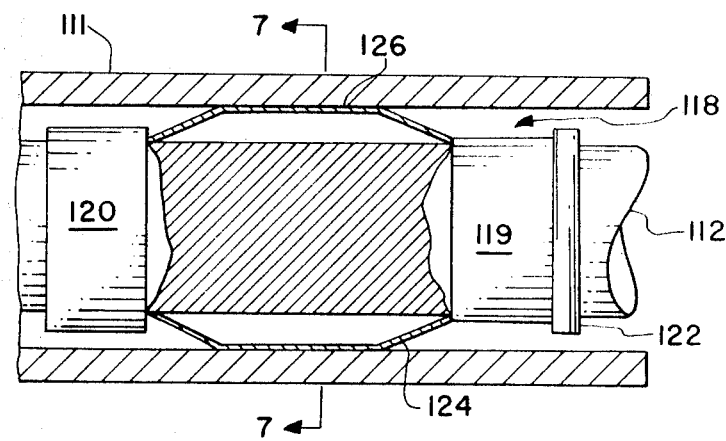
FIG. 6 is a part sectional view similar to FIG. 4 showing a modified form of a model damper.
Figure 7:
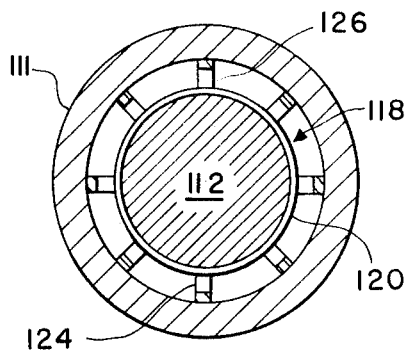
FIG. 7 is a sectional view taken along lines 7–7 of FIG. 6.
Figure 8:
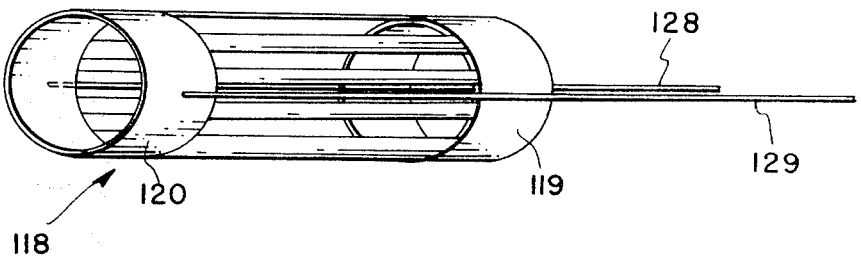
FIG. 8 is a view of the damper shown in FIG. 6 in its relaxed condition.

Referring now to FIGS. 6, 7 and 8 a mechanical damper system will now be described. In this embodiment a wind tunnel model 111 is shown positioned on a sting 112 with a damper 118 disposed within model 111 and on sting 112. Damper 118 consists of a pair of ring members 119 and 120, in spaced slidable position about a portion of the length of sting 112. A suitable collar 122, threaded or otherwise secured to sting 112, prevents damper 118 from sliding aft beyond this point on sting 112. A plurality of circumferentially disposed flat spring fingers are integrally secured to each of ring members 119 and 120 and two of which are shown in FIG. 6 and designated by reference numerals 124 and 126, with the others shown in FIGS. 7 and 8 and not designated.

Spring fingers 124, 126 and the others, not designated, are designed to flex at specific points along the length thereof when ring members 119 and 120 are forcibly moved relative to each other. This flexing movement causes the spring fingers to engage model 111 along a substantial portion of the length of the fingers to assist in supporting model 111 during starting and stopping of the wind tunnel. As shown more particularly in FIG. 8, a pair of cables 128 and 129 are fixedly attached to the exterior of ring member 120 and extend past ring member 119, passing between the spring fingers on damper 118, and are slidably received through suitable openings, not shown, in collar 122. Cables 128 and 129 extend through the sidewalls of the wind tunnel and, by aid of a suitable pulley system, or the like, not shown, are selectively retracted to cause flexing of the damper fingers and engagement thereof with model 111.

OPERATION

The operation of the invention is now believed apparent. In the first embodiment, a conventional six-component, internal strain gauge balance 16 (FIG. 2) is attached to the end of sting 12 and positioned within cavity 14 of model 11. The lead wires for balance 16 extend through cavity 14 exterior of wind tunnel 10 in a conventional manner to record the data obtained during a test and are not shown in the interest of clarity. Before starting tunnel 10 the damper 18 is inflated to the condition shown in FIGS. 4 and 5 to protect model 11 against starting loads. This is accomplished by the rise of pressurized air received by inlet tubes 20 and 22 from a suitable source, not shown. After steady flow is established in the test section, damper 18 is deflated by releasing the pressure on tubes 20 and 22, or by connecting tubes 20 and 22 to a suitable vacuum source, and the test data from balance 16 is recorded. After recording of the data and immediately prior to tunnel shutdown, damper 18 is again inflated to assist in support of model 11 to alleviate the stopping loads on the balance-model system.

The embodiment shown in FIGS. 5—8 operates in a similar manner. After positioning the tunnel balance (not shown) and model 111 in test position on sting 112, and prior to starting of the wind tunnel, pressure is applied to retracting cables 128 and 129 to cause ring member 120 to slide relatively toward ring member 119. This relative movement of the rings causes flexing of fingers 126, 128 and the others, not designated, so as to engage the interior of model 111. Any conventional system such as an electric motor, pulley system or the like, may be used to apply the retraction forces on cables 128 and 129 to induce movement of ring 120 and flexing of the spring fingers. After the flow becomes steady in the tunnel the pressure on cables 128 and 129 is relaxed and the spring members 124 and 126, and others, relax to their unflexed position as shown in FIG. 8 to provide sufficient clearance between damper 118 and model 111 for unimpeded testing thereof. After testing and recording of the test data, cables 128 and 129 are again placed under tension to again flex the damper fingers for support of model 111 during tunnel shutdown.

Some of the obvious advantages of the damper systems of the present invention reside in the simplicity and low cost of fabrication, the location of the damper inside the model cavity to eliminate the need for complex retraction mechanisms, the application of counteracting pressures on the model during use of the dampers and the elimination of the need for critical adjustments for different rest models.

Although the invention has been described relative to the specific advantages pointed out above, other uses and advantages will be readily apparent to those skilled in the art. Additionally, no specific materials have been described for fabricating the dampers since it is readily apparent that the inflatable embodiment may be manufactured from rubber, plastics, reinforced fabrics and the like. The embodiment illustrated by FIGS. 6—8 would preferably have spring steel fingers and the retracting cables may be any suitable cord or metal capable of withstanding the retraction forces involved. Also, although the inflatable damper 18 is shown as having two compartments of three divisions each, the invention is not so limited and any number of compartments and divisions are considered within the scope of the invention.

Obviously, many modifications and variations of the present invention are possible in the light of the foregoing specific examples and teachings.

What is claimed as new and desired to be secured by Letters Patent of the United States is:

I claim:

1. The combination of a wind tunnel model and apparatus for alleviating airflow shock loads on the model during the starting and stopping phases of a wind tunnel operation where unsteady flow exists and leads to transient shocks and possible damage to the model and test balances on the model, comprising:

a wind tunnel model and test balance mounted on a wind tunnel sting in position for a test, said model being provided with an elongated opening at the aft end thereof and surrounding the wind tunnel sting, a unitary inflatable bag extending over a portion of the length of said sting within said elongated opening of said model, air inlet and air outlet means in fluid communication with said inflatable bag, said inflatable bag when in deflated condition fitting snugly about said sting and when in inflated condition having portions thereof engaging the interior of said elongated opening in said model, whereby immediately prior to starting of the wind tunnel said inflatable bag will be inflated by said air inlet means to thereby produce firm load forces against the model to assist in holding the model in position and thus reduce forces transmitted to the model balance.

2. A system for alleviating airflow shock loads on a wind tunnel model during starting and stopping of the tunnel to avoid possible damage to the model and test balances associated with the model comprising, in combination:

a wind tunnel model, a model test balance, a model sting mounting said model and test balance within a wind tunnel in position for a test, said model being provided with an elongated opening at the aft end thereof surrounding and being spaced from portions of said sting, an elongated inflatable bag extending over a portion of the length of said sting disposed within said model, air inlet and air outlet means in fluid communication with said inflatable bag and adapted for selective inflation and deflation of said bag, said inflatable bag, when deflated, fitting snugly about said sting and remaining spaced from said model and, when inflated, serving to engage and provide load forces along a length of said elongated opening in said model to thereby assist in holding the model in fixed position and alleviate sudden shocks on the model-balance system during starting and stopping of the tunnel.

3. Apparatus for damping undesired transient loads on a balance-sting-model system during starting and stopping of a wind tunnel test comprising:

a wind tunnel having a sting-balance assembly therein for positioning a model for testing, a wind tunnel model positioned on said sting-balance, at least an aft end portion of said model extending around and spaced from a length of said sting, means secured to said length of said sting for selectively engaging and assisting in supporting said model during starting and stopping of wind tunnel operation and movable out of contact with said model during a test.

4. Apparatus for alleviating the sudden shock loads on a wind tunnel model-balance system normally experienced during the sudden starting and shutdown of a wind tunnel comprising, in combination:
a wind tunnel model and balance system positioned on a wind tunnel sting within a wind tunnel for a test, and
means for selectively engaging and assisting in supporting said wind tunnel model only during starting and stopping operation of the wind tunnel.

5. The apparatus as in claim 4 wherein said wind tunnel model is provided with a stepped elongated opening at the aft end thereof and said wind tunnel sting is received by said elongated opening to support said model.

6. The apparatus of claim 5 wherein a portion of the length of said sting is spaced from said wind tunnel model.

7. The apparatus of claim 6 wherein said means for selectively engaging and assisting in supporting said model is circumferentially disposed about said portion of the length of said sting.

8. The apparatus of claim 7 wherein said means consists of an inflatable bag, said inflatable bag serving to provide load support forces to said model when in the inflated condition, and serving to snugly engage said sting and remain out of contact with said model when in deflated condition.

9. The apparatus of claim 7 wherein said means consists of a pair of ring members slidably received by said sting and a plurality of flexible steel springs circumferentially disposed about said sting and integral with said ring members, and means for selectively sliding said pair of ring members relatively toward each other so as to cause said flexible steel springs to flex and engage said model to assist in support thereof.

10. The apparatus of claim 7 wherein said inflatable bag is divided into a pair of separate compartments with individual means being provided in each said compartment for admitting an inflation medium therein.

11. The apparatus of claim 10 wherein each said compartment is divided into a plurality of longitudinal divisions.